United States Patent [19]

Lang et al.

[11] Patent Number: 4,488,140

[45] Date of Patent: Dec. 11, 1984

[54] CLUTCH TEMPERATURE MONITOR

[75] Inventors: Stephen P. Lang, Waterloo; Yolanda E. Martin, Cedar Falls; Patrick E. Pinkston, Traer, all of Iowa

[73] Assignee: Deere & Company, Moline, Ill.

[21] Appl. No.: 379,231

[22] Filed: May 17, 1982

[51] Int. Cl.³ .................. B60Q 1/00; G08B 23/00
[52] U.S. Cl. .................... 340/57; 340/52 R; 340/60; 340/501; 340/588; 340/679; 73/510; 74/856; 180/177; 180/278; 374/102; 374/141; 374/144; 192/3.51; 192/30 W
[58] Field of Search ........... 340/57, 52 R, 52 F, 340/501, 60, 59, 588, 589, 591, 596, 611, 614, 626; 74/856; 192/3.51, 30 W; 180/282, 170, 278, 177, 176, 175, 179; 374/100-102, 129, 141-144; 116/216; 73/510

[56] References Cited

U.S. PATENT DOCUMENTS

| | | | |
|---|---|---|---|
| 3,704,458 | 11/1972 | Buchanan et al. | 340/60 |
| 3,893,108 | 7/1975 | McBride, Jr. et al. | 340/60 |
| 3,906,437 | 9/1975 | Brandwein et al. | 340/27 |
| 3,944,969 | 3/1976 | Arai et al. | 340/52 F |
| 4,184,146 | 1/1980 | Fratzke et al. | 340/52 F |

Primary Examiner—Donnie L. Crosland

[57] ABSTRACT

An agricultural vehicle, such as a tractor, includes an engine and a hydraulic assist-type transmission coupled together by a clutch. A monitor includes sensors for sensing engine speed, clutch temperature and transmission temperature. Warning signals are generated if the clutch temperature is continuously and at least a certain amount hotter than the transmission temperature for a certain time period. The warning signals are disabled if the engine speed is less than a threshold and for a certain time interval after the engine speed exceeds the threshold.

10 Claims, 3 Drawing Figures

CLUTCH TEMPERATURE MONITOR

BACKGROUND OF THE INVENTION

The present invention relates to a monitoring system for monitoring the temperature of a vehicle clutch.

The advent of microprocessor technology has made possible the monitoring of various vehicle operating parameters according to complex criteria. For example, an engine oil pressure monitoring system is described in copending U.S. application, Ser. No. 378,704, filed May 17, 1982; a transmission oil pressure monitoring system is described in copending U.S. application, Ser. No. 379,230 filed May 17, 1982; and a transmission filter monitor system is described in copending U.S. application, Ser. No. 378,703, filed May 17, 1982; all assigned to the assignee of the present invention. However, none of these monitoring systems provides an indication of the operating status of the vehicle clutch. Now, with an operator-controlled clutch, it is possible for the operator to cause clutch slippage for an extended period of time at high clutch input energy levels. This clutch slippage can cause undesirable heating and wear of the clutch components. It would be desirable to provide the vehicle operator with some kind of warning signal when this heating condition occurs so that he can modify his operation of the vehicle in time to prevent serious damage to the clutch components.

SUMMARY OF THE INVENTION

It is an object of the present invention to provide a vehicle operator with an indication of the occurance of a potentially harmful heating condition of a vehicle clutch.

It is a further object of the present invention to prevent generation of warning signals under conditions which could otherwise cause generation of misleading warning signals.

Another object of the present invention is to provide a temperature monitoring system which is compensated for ambient and system temperature variations.

The present invention achieves these and other objects by providing separate resistance-type sensors for sensing the temperature of a clutch by monitoring the temperature of the lube oil which has passed through the clutch and by monitoring the temperature of the hydraulic fluid in a portion of a hydraulic assist-type transmission. An engine speed sensor senses the vehicle engine speed. The clutch lube oil temperature is compared to an alarm temperature value which is a certain amount higher than the sensed transmission lube oil temperature. Alarm signals are generated if the clutch lube oil temperature is greater than the alarm temperature value. However, the warning signals are disabled if the engine speed is less than 500 rpm, for certain time intervals after the engine speed exceeds 500 rpm, and unless the clutch temperature continuously exceeds the alarm temperature value for at least a certain time period.

DETAILED DESCRIPTION

Figure 1:
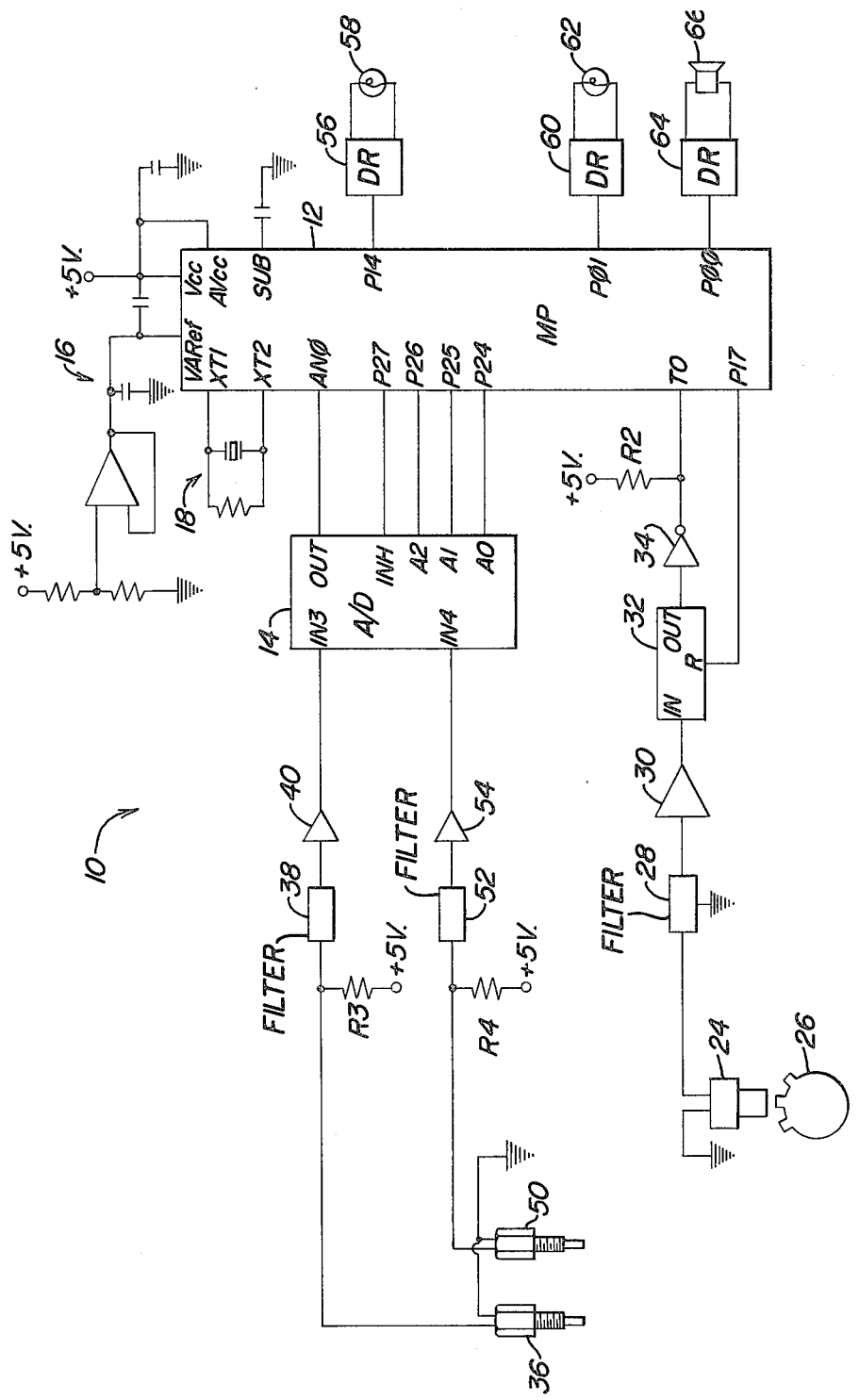
FIG. 1 is a schematic block diagram of a monitoring system constructed according to the present invention.

The monitoring system 10 includes a conventional microprocessor 12, such as Intel's 8022 A/D Converter and Microprocessor, coupled to a conventional 8-to-1 analog multiplexer 14, such as is available from National Semiconductor or Motorola. A regulating circuit 16 provides a regulated 4-volt reference voltage to the VARef input of the microprocessor 12 for use as a reference voltage in its internal A-to-D converter. A crystal circuit 18 provides a 3.6 MHz clock signal for the microprocessor 12. Microprocessor terminals P24–P27 are connected to corresponding address terminals of the multiplexer 14.

An engine speed sensor 24, such as available from Wabash Magnetics, is a sensing coil surrounding a permanent magnet positioned adjacent to a timing gear 26 of the vehicle engine (not shown). Sensor 24 generates a signal with a frequency proportional to the rpm of the vehicle engine. This signal is coupled to a TO input of the micro 12 via electromagnetic interference (EMI) filter 28, Schmitt trigger 30, divide-by-10 counter 32 and inverter 34. A pull-up resistor R2 couples the output of inverter 34 to +5 volts. Data representing the engine speed is derived from sensor 24 and counter 32 in the following manner: A time interval is defined by the time required for consecutive pulses to be generated at the out terminal of the counter 32. This interval is thus proportional to the time required for 10 pulses to be generated by sensor 24, and is therefore inversely proportional to the rotation speed of the timer gear 26 and of the engine. A value representing engine speed may then be obtained by applying appropriate scaling factors to the inverse of the time interval. As part of this procedure, the counter 32 periodically receives reset signals at its reset R input from the P17 terminal of the microprocessor 2, so that it can respond to further groups of 10 pulses from sensor 24. A transmission oil temperature sensor 36 is positioned in any convenient location in the hydraulic circuit of the hydraulic assist transmission (not shown), for example, in a line between the cooler (not shown) and the transmission components to be lubricated (not shown). The signal from sensor 36 is coupled to an input IN3 of multiplexer 14 via EMI filter 38 and amplifier 40.

The monitoring system 10 also includes a clutch temperature sensor 50 which is a resistance-type sensor positioned in the traction clutch housing (not shown) so that oil flowing through the rotating clutch components impinges upon the sensor element. The signal from sensor 50 is coupled to +5 volts via pull-up resistor R4 and to an IN4 input of A/D converter 14 via EMI filter 52 and signal amplifier 54.

The P14 output of micro 12 is coupled to a lamp driver 56 for driving a clutch temperature warning light 58. The P01 output of micro 12 is coupled to a lamp driver 60 for driving a warning light 62. The P00 output of micro 12 is coupled to a horn driver 64 for driving a horn 66.

Figure 2A:
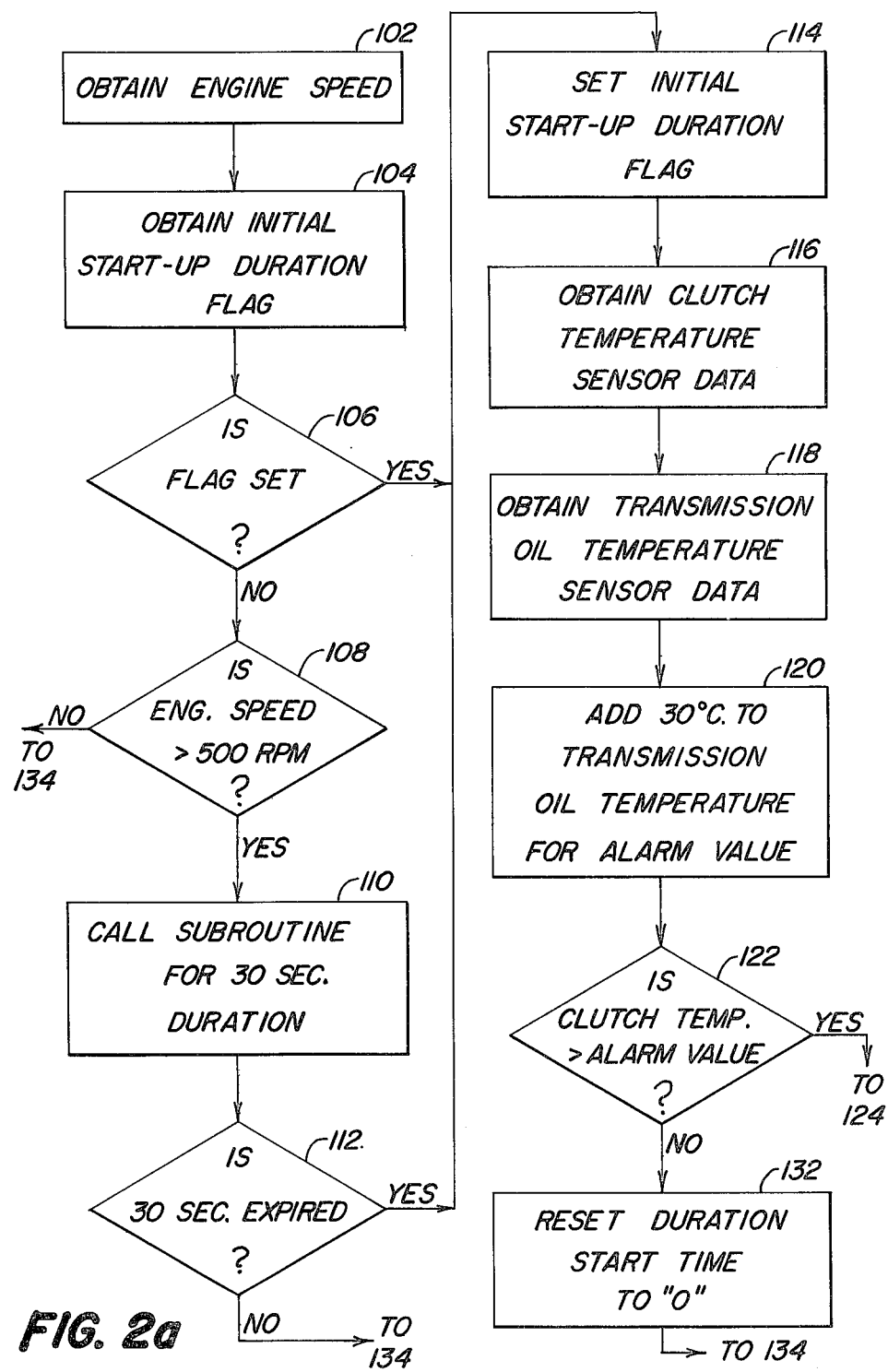
FIGS. 2a and 2b are flow charts illustrating the operation of the present invention.
Figure 2B:
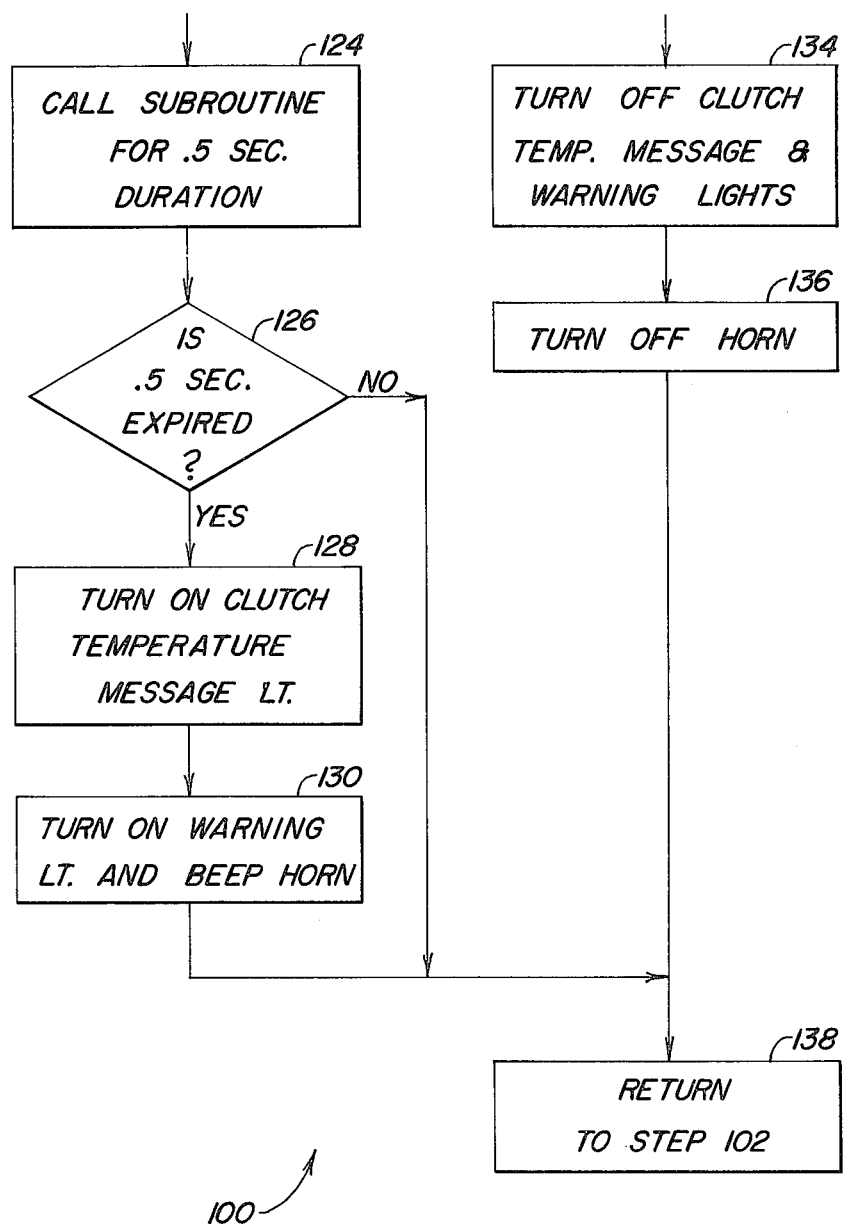

The monitoring system 10 performs a clutch temperature monitoring function according to the algorithm described by the flow chart 100 illustrated in FIGS. 2a and 2b. The algorithm begins at step 102 where the sensed engine speed is obtained. Then, in step 104, a start-up duration flag value is obtained. If, in step 106, the start-up duration flag is set, then the rotine proceeds to step 114, otherwise, the routine proceeds to step 108. If, in step 108, the sensed engine speed is greater than 500 rpm, the algorithm proceeds to step 110, otherwise, the routine proceeds to step 134.

In step 110, a duration subroutine is entered. Briefly, the duration subroutine clears an accumulator to zero if the desired duration period, in this case 30 seconds, has not expired. If the desired duration period has expired, then the duration subroutine sets the accumulator to FFH, which is a hexidecimal term meaning that the accumulator contains nothing but binary 1 values. This duration subroutine is the same as that which is described in detail in copending U.S. application, Ser. No. 379,230, filed May 17, 1982 which is incorporated herein by reference, except that the desired duration period is changed to 30 seconds. If the duration period has not expired, then step 112 directs the algorithm to steps 134–136 which generate instructions to turn off the clutch temperature and warning lights 58 and 62 and the horn 66. Finally, step 138 returns the algorithm to step 102.

If the 30 second duration period has expired, then step 112 directs the algorithm to step 114 where the initial start-up duration flag is set to indicate that the 30 second duration has expired. Next, the clutch temperature data from sensor 50 is obtained in step 116 and the transmission oil temperature data is obtained from sensor 36 in step 118. Then, in step 120, an alarm value is obtained by adding 30 degrees celsius to the sensed transmission oil temperature.

If the sensed clutch temperature is not greater than the alarm value, then step 122 directs the algorithm to step 132 where a duration start time register is cleared to zero so that when the duration subroutine is re-entered later, it will execute the entire desired duration period. Following step 132, the algorithm proceeds to previously described steps 134–138.

If, on the other hand, the sensed clutch temperature is greater than the alarm value, then step 122 directs the algorithm to step 124 where the previously described duration subroutine is called again, but this time, for a 0.5 second duration. If the 0.5 second duration period has not expired, then step 126 directs the algorithm to previously described step 138, otherwise, to step 128 where the clutch temperature light 58 is turned on. Then, step 130 causes the warning light 62 and the horn 66 to also turn on, after which the algorithm proceeds to previously described step 138.

Thus, the above described system generates warning signals if the clutch temperature is greater than the transmission oil temperature, plus 30 degrees celsius, for a continuous period of at least 0.5 second. However, this warning function is disabled upon engine start-up for at least a 30 second period beginning from the time the engine speed exceeds 500 rpm. This disabling function prevents generation of misleading warning signals during "warming up" of the vehicle.

The conversion of the above flow chart into a standard language for implementing the algorithm described by the flow chart in a digital data processor, such as the microprocessor 12, will be evident to those with ordinary skill in the art.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:
1. In an engine-driven vehicle having a hydraulic assist-type transmission coupled to the engine by an operator-engageable and disengageable clutch, a clutch monitor system comprising:
   a clutch temperature sensor for generating a clutch temperature signal representing a temperature of the clutch;
   a transmission temperature sensor for generating a transmission temperature signal representing a temperature of hydraulic fluid in a portion of the hydraulic assist transmission;
   means for generating an alarm value derived from the sensed transmission temperature; and
   means for generating a warning signal when the sensed clutch temperature is greater than the alarm value.
2. The invention of claim 1, further comprising:
   first means for sensing rotation speeds of the engine;
   disabling means for preventing generation of the warning signal when the engine speed is not greater than a threshold value; and
   second disabling means for preventing generation of the warning signal until a certain time interval expires following a time when the engine speed exceeds the threshold value.
3. The invention of claim 1, further comprising:
   disabling means for preventing generation of the warning signal unless the sensed clutch temperature continuously exceeds the alarm value for at least a predetermined time period.
4. The invention of claim 1, further comprising:
   first disabling means for preventing generation of the warning signal unless the sensed clutch temperature continuously exceeds the alarm value for at least a predetermined time period;
   second disabling means for preventing generation of the warning signal when the engine speed is not greater than a threshold value; and
   third disabling means for preventing generation of the warning signal until a certain time interval expires following a time when the engine speed exceeds the threshold value, the time interval being longer than the time period.
5. In an engine-driven vehicle having a hydraulic assisttype transmission coupled to the engine by an operator-engageable and disengageable clutch, a clutch monitor system comprising:
   means for sensing rotation speeds of the engine;
   a clutch temperature sensor for generating a clutch temperature signal representing a temperature of the clutch;
   a transmission temperature sensor for generating a transmission temperature signal representing a temperature of hydraulic fluid in a portion of the hydraulic assist transmission;
   means for generating an alarm temperature value which is a certain temperature interval greater than the sensed transmission temperature; and
   means for generating a warning signal when the sensed clutch temperature is greater than the alarm value.
6. The invention of claim 5, further comprising:
   first disabling means for preventing generation of the warning signal when the engine speed is not greater than a threshold value; and
   second disabling means for preventing generation of the warning signal until a certain time interval expires following a time when the engine speed exceeds the threshold value.

7. The invention of claim 5, further comprising:
disabling means for preventing generation of the warning signal unless the sensed clutch temperature continuously exceeds the alarm value for at least a predetermined time period;

8. In an engine-driven vehicle having a hydraulic assisttype transmission coupled to the engine by an operator-engageable and disengageable clutch, a clutch monitor system comprising:
means for sensing rotation speeds of the engine;
a clutch temperature sensor for generating a clutch temperature signal representing a temperarure of the clutch;
a transmission temperature sensor for generating a transmission temperature signal representing a temperature of hydraulic fluid in a portion of the hydraulic assist transmission;
means for generating an alarm temperature value which is a certain temperature interval greater than the sensed transmission temperature; and
first disabling means for preventing generation of the warning signal when the engine speed is not greater than a threshold value; and
second disabling means for preventing generation of the warning signal until a certain time interval expires following a time when the engine speed exceeds the threshold value.

9. The invention of claim 8, further comprising:
disabling means for preventing generation of the warning signal unless the sensed clutch temperature continuously exceeds the alarm value for at least a predetermined time period.

10. The invention of claim 9, wherein the time interval is longer than the time period.

* * * * *

UNITED STATES PATENT AND TRADEMARK OFFICE
CERTIFICATE OF CORRECTION

PATENT NO. : 4,488,140

DATED : 11 December 1984

INVENTOR(S) : Stephen Paul Lang et al

It is certified that error appears in the above-identified patent and that said Letters Patent is hereby corrected as shown below:

Column 4, line 46, delete "assisttype" and insert -- assist-type --.
Column 5, line 11, delete "assisttype" and insert -- assist-type --.

Signed and Sealed this

Ninth Day of July 1985

[SEAL]

Attest:

DONALD J. QUIGG

Attesting Officer     Acting Commissioner of Patents and Trademarks